May 14, 1968  H. D. FAHRENHOLZ  3,382,684
SLIP CLUTCH
Filed May 19, 1966
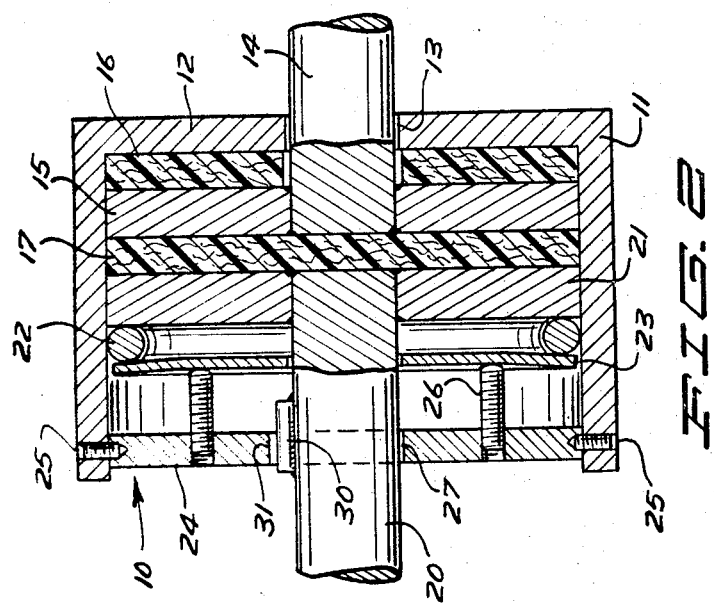
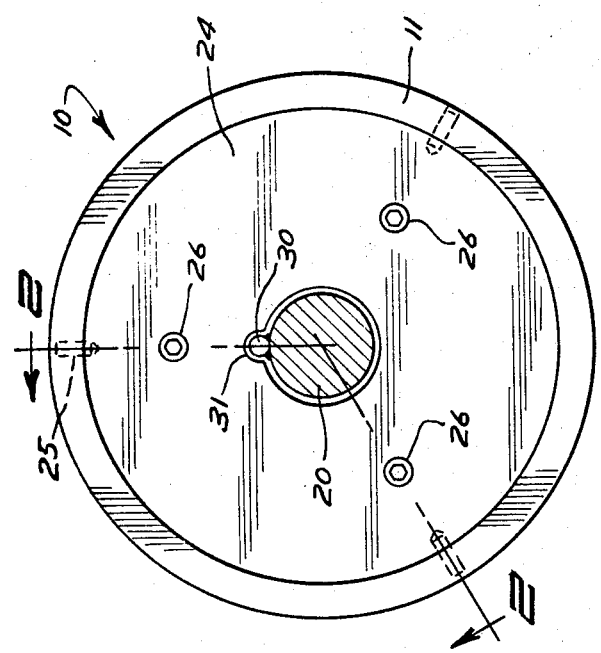
INVENTOR.
HARLEY D. FAHRENHOLZ
BY
Dugger Johnson & Westman
ATTORNEYS

United States Patent Office

3,382,684
Patented May 14, 1968

3,382,684
SLIP CLUTCH
Harley D. Fahrenholz, Clarissa, Minn. 56440
Filed May 19, 1966, Ser. No. 551,430
3 Claims. (Cl. 64—30)

ABSTRACT OF THE DISCLOSURE

A slip clutch having an outer housing which surrounds the clutch assembly. The clutch assembly includes a driving disc sandwiched between a pair of friction discs, one of which abuts against an end wall of the housing and the other of which abuts against a disc that rotates with the housing. Pressure adjustment means are provided to force the friction material against the driving disc. The housing is completely enclosed to keep out dirt and foreign material.

---

The present invention has relation to a slip clutch and more particularly to a totally enclosed slip clutch which will sustain extended periods of slipping and which will not freeze up during use.

The device of the present invention is simple to manufacture, and is effective in use for providing a high capacity clutch that will take slippage for a large percentage of its operation.

It is therefore an object of the present invention to present a totally enclosed slip clutch unit. It is a further object of the present invention to present a slip clutch unit which can be easily manufactured and which will take sustained slipping for long periods of time.

Other objects are inherent in the specification and will become apparent as the description proceeds.

In the drawings,

FIG. 1 is a front elevational view of a slip clutch made according to the present invention; and FIG. 2 is a sectional view taken as on line 2—2 in FIG. 1.

Referring to the drawings and the numerals of reference thereon, a slip clutch unit illustrated generally at 10, includes an outer housing 11, which is a hollow cylinder. The closed end 12 has an opening 13 through which a drive shaft 14 leading from a source of power (not shown) is passed. Shaft 14 has attached thereto a drive plate 15. The drive plate 15 is of size to slide inside the cylinder 11 and fit closely within the inner surface of the cylinder. A friction disc 16 made of a high heat resistant, wear resistant, friction material, which is known in the art and a matter of selection, is positioned between the plate 15 and the inner surface of the closed end 12 of the cylinder 11. A second friction disc 17 of the same material is placed against the outer face of the plate 15. A driven shaft 20 which has a driven disc 21 attached thereto is then slid into the interior of the cylinder 11 as shown, and the outer face of the disc 21 abuts against the friction disc 17. An annular ring 22 (circular cross section) is placed against the outer face (on the shaft side) of the driven disc 21 and a metal washer 23 is slid over the shaft 20 and positioned against the ring 22. The friction material in discs 16 and 17 has a stable coefficient of great wear or loss of frictional properties.

It should be noted that the discs 15, 16, 17 and 21, the ring 22 and the washer 23 are all of size to fit closely within the inner surface of the outer cylinder 11, so that they are actually guided and positioned by the cylinder in order to miantain axial alignment.

A cover plate 24 having an opening 27 for shaft 20, is then slid into the open end of the housing or cylinder 11 and held in place with Allen head set screws 25. As shown, the set screws 25 are threaded through the wall of housing 11 and seat in depressions within the cover plate 24 to hold it securely. A plurality of adjustment screws 26 are threadably mounted through the cover plate 24 and these engage the washer 23. The adjustment screws 26 can be tightened down until the force from the washer, ring 22 and the disc 21 is sufficient so that the disc 15 is held between the friction plates 16 and 17 so that there is a driving connection from the plates to the outer housing and to the driven disc 21. Thus, when the drive shaft 14 is driven from its source of power the disc 15 will be rotated and it will rotate the outer housing 11 as well as the driven disc 21 and the shaft 20. A power drive can be placed on shaft 20 directly, or it could be attached directly to the housing 11, if desired. For example, a sprocket could be bolted to the housing or mounted on shaft 20 and the slip clutch could be used for chain and sprocket drive.

All of the screws (25 and 26) are recessed into the provided holes to prevent material from being caught and wrapping.

In order to make sure that the slipping takes place at the friction discs, shaft 20 has a small piece of round shaft 30 fixed thereto. This fits within an opening 31 in plate 24. The opening 31 forms a keyway to prevent the shaft 20 from slipping relative to the housing 11. There is a sliding fit between the round shaft 30 and the keyway.

The slip clutch of the present invention finds its greatest use in connection with devices where there is a good deal of slipping. One such device is a rock windrower which has a roller that runs in the dirt to windrow rocks as it moves along and which must slip quite frequently during operation.

It should be noted that the discs can be kept in alignment by the close tolerances between the outer periphery of the discs and the inner surface of the housing, or bearings could be placed in the opening 13 so that the shaft 14 rode on a bushing or bearing.

The action of the adjustment screws 26 against the washer compresses the discs together in axial direction so that the torque capacity of the clutch can be adjusted. The torque capacity will be quite high, yet there will be no way that weather can get in to cause rusting or freezing of the discs. The cover 24 and the openings 27 and 13 can be sealed with suitable devices in order to completely seal out the weather.

When the torque exceeds that which can be carried, the driving disc 15 will slip with respect to discs 16 and 17, or slippage will occur at the mating surfaces.

The clutch is very small in diameter and can carry a large torque for its size. The housing has a relatively large surface area so heat will be dissipated more rapidly to insure satisfactory operation.

What is claimed is:

1. A slip clutch comprising a cylindrical outer housing having a normally open end and one substantially closed end, said housing having a substantially smooth interior cylindrical surface, a driving member, said driving member comprising a first shaft passing through a provided opening in said substantially closed end of said housing, a first disc-like member having a periphery closely fitting within the interior surface of said cylindrical housing drivably attached to said first shaft, a first friction disc said substantially closed end of said housing, said first positioned over said shaft against the interior surface of disc-like member on said shaft bearing against said first friction disc, a second friction disc positioned against an opposite side of said first disc-like member, both of said first and second friction discs having outer peripheries fitting closely within the interior surface of said housing, a second disc-like member bearing against said second friction disc on opposite sides thereof from said first disc-like member and being of size to closely fit within the interior chamber of said cylindrical housing, an annular ring having a large open center bearing against said second disc-like member and having an outer periphery closely fitting within the interior surface of said cylindrical housing, a disc-like washer positioned against said ring on a side thereof opposite from said second disc-like member, a plate fitting within the housing and closing the normally open end of said housing and being substantially the same size as the interior surface of said housing, means to retain said plate from movement in axial direction of said housing, and threadable means passing through said plate in a plurality of spaced locations and bearing against said washer at position spaced inwardly from the inside diameter of said annular ring to exert an axial pressure force against said washer in direction toward the substantially closed end of the housing to thereby force said first disc-like member to be held between said first and second friction discs, and driven means drivably coupled to said cylindrical housing.

2. The combination as specified in claim 1 wherein said driven means comprises a second shaft concentric with said first shaft drivably attached to said second disc-like member, said plate having an opening through which said shaft extends, and key means between said plate and said second shaft to effect a rotational driving connection between said plate and said shaft.

3. The combination as specified in claim 2 wherein said means to retain said plate on said housing comprise a plurality of set screws threadably mounted into the wall of the housing and extending radially inwardly and threadably mounted in an outer portion of said plate.

References Cited
UNITED STATES PATENTS

| | | | |
|---|---|---|---|
| 1,039,125 | 9/1912 | Hardy | 64—30 |
| 1,340,811 | 5/1920 | Ballman. | |
| 1,807,210 | 5/1931 | Hinnekens | 64—30 |
| 2,323,355 | 7/1943 | Ricciardi | 64—30 |
| 2,857,750 | 10/1958 | Fox | 64—30 |
| 3,105,371 | 10/1963 | Forrest | 64—30 |
| 3,208,316 | 9/1965 | Scribner | 64—30 |

HALL C. COE, *Primary Examiner.*

UNITED STATES PATENT OFFICE
CERTIFICATE OF CORRECTION

Patent No. 3,382,684  May 14, 1968

Harley D. Fahrenholz

It is certified that error appears in the above identified patent and that said Letters Patent are hereby corrected as shown below:

Column 1, line 26, "slippage" should read -- slipping --.
Column 2, lines 63 and 64, cancel "said substantially closed end of said housing, said first positioned over said shaft against the interior surface of" and insert -- positioned over said shaft against the interior surface of said substantially closed end of said housing, said first --.

Signed and sealed this 30th day of September 1969.

(SEAL)
Attest:

Edward M. Fletcher, Jr.  WILLIAM E. SCHUYLER, JR.
Attesting Officer  Commissioner of Patents